US011409860B2

(12) United States Patent
Wang

(10) Patent No.: US 11,409,860 B2
(45) Date of Patent: Aug. 9, 2022

(54) SYSTEM AND METHOD FOR REMOTE AUTHENTICATION

(71) Applicant: Equalearning Corp., Huntington Beach, CA (US)

(72) Inventor: Shih-Yuan Wang, Capistrano Beach, CA (US)

(73) Assignee: Equalearning Corp., Huntington Beach, CA (US)

( * ) Notice: Subject to any disclaimer, the term of this patent is extended or adjusted under 35 U.S.C. 154(b) by 52 days.

(21) Appl. No.: 16/880,842

(22) Filed: May 21, 2020

(65) Prior Publication Data
US 2021/0365540 A1    Nov. 25, 2021

(51) Int. Cl.
*H04L 29/06*    (2006.01)
*G06F 21/44*    (2013.01)
*G06F 21/62*    (2013.01)
*H04L 9/40*    (2022.01)
*G06F 21/31*    (2013.01)

(52) U.S. Cl.
CPC .............. *G06F 21/44* (2013.01); *G06F 21/31* (2013.01); *G06F 21/62* (2013.01); *H04L 63/0428* (2013.01)

(58) Field of Classification Search
CPC ... H04L 67/10; H04L 63/105; H04L 63/0428; G06F 21/44; G06F 21/31; G06F 21/62
See application file for complete search history.

(56) References Cited

U.S. PATENT DOCUMENTS

| | | | | |
|---|---|---|---|---|
| 2002/0007456 A1* | 1/2002 | Peinado | ............... | H04L 9/3263 713/164 |
| 2003/0069904 A1* | 4/2003 | Hsu | ........................ | G06F 21/10 |
| 2007/0245409 A1* | 10/2007 | Harris | .................... | H04L 67/34 726/5 |
| 2007/0288386 A1* | 12/2007 | Adachi | ................... | G06F 21/10 705/58 |
| 2008/0060084 A1* | 3/2008 | Gappa | ..................... | G09B 5/00 726/28 |
| 2008/0307508 A1* | 12/2008 | Conley | ................ | G06F 21/725 726/4 |
| 2010/0125907 A1* | 5/2010 | Jonsson | ............... | H04L 9/3226 726/18 |

* cited by examiner

*Primary Examiner* — Jason K Gee
(74) *Attorney, Agent, or Firm* — Wang Law Firm, Inc.

(57)    ABSTRACT

A system enables a content creator to upload the content onto the server and set rules and conditions for the access and retrieval. The content is downloaded to a portable storage medium, the content will be encrypted for display at a particular destination device. When the content is loaded on the destination device, the destination device will check if the content is loaded on the correct destination device by checking the information of the destination device attached to the content against the device information stored on the destination device.

12 Claims, 4 Drawing Sheets

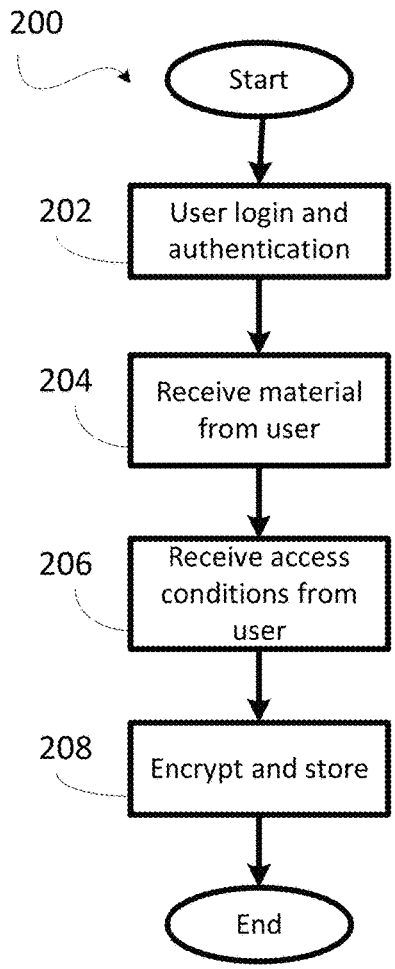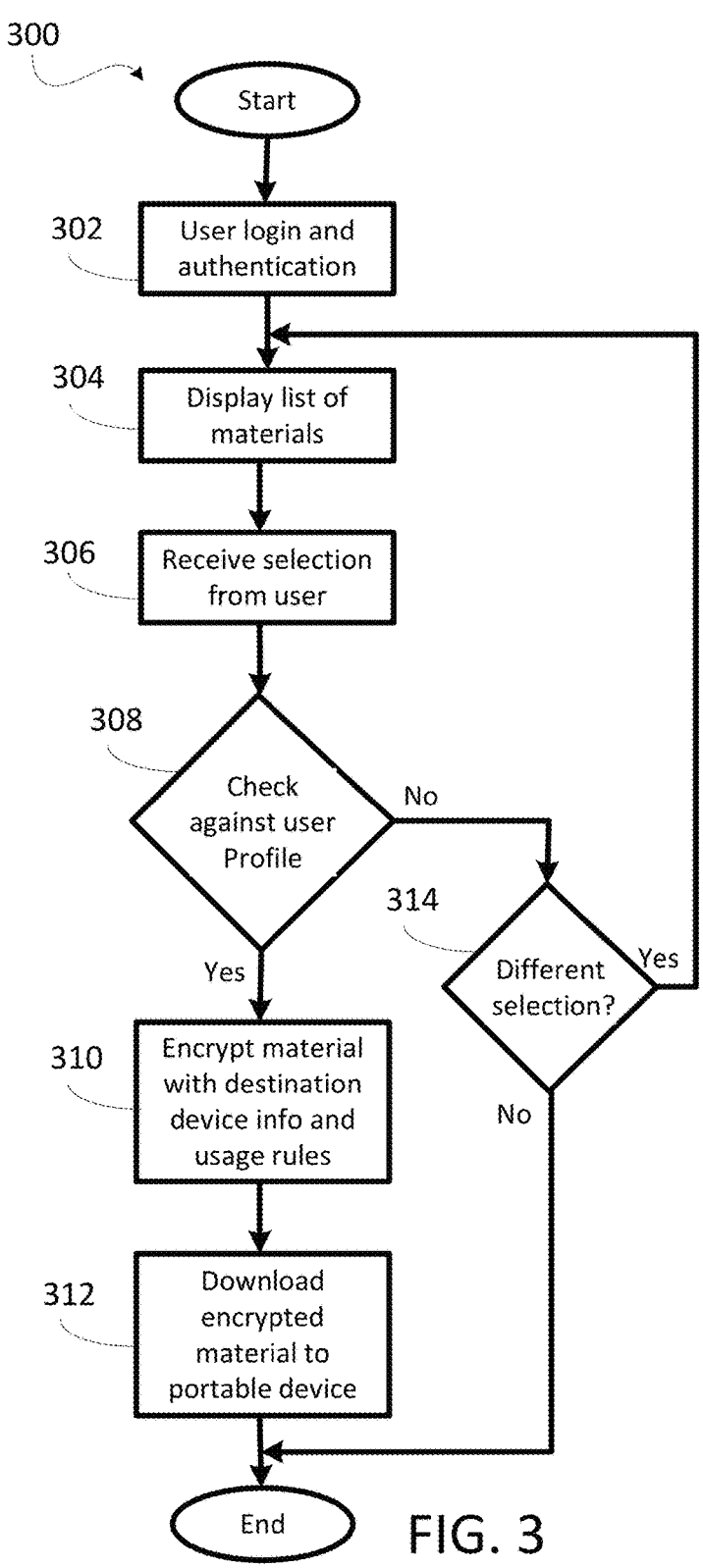
FIG. 2
FIG. 3

SYSTEM AND METHOD FOR REMOTE AUTHENTICATION

FIELD OF THE INVENTION

The present invention generally relates to computer-based authentication, and more specifically to a system and method for remote authentication without a network.

BACKGROUND OF THE INVENTION

Nowadays when a software is executed on a computing device, it is common for the computing device to send an authentication request to a remote server. If the authentication request is unsuccessful, either denied by the remote server or for failure of communication, the software will not be executed. The communication from the computing device to the remote server is essential to the authentication process. The reliance on a network poses a problem to educators who have to travel to a remote region because the network may not be reliable or, even worse, may not be available.

The aforementioned shortcoming prevents the computer-based learning systems from achieving the potential benefit that they may provide and it is to a system that enables the students to fully benefit from the computer-based learning system that the present application is primarily directed.

SUMMARY OF THE INVENTION

The present invention has been made to overcome the aforementioned disadvantages of conventional methods. The present invention provides a method for authenticating a data transported from a remote server to a destination device. The method comprises transferring the data with encrypted information on the destination device from the remote server to the destination device, receiving authentication information from a user, if the authentication information is correct, decrypting the data to have destination device information, and if the destination device information matches information stored in the destination device, enabling access to a content in the data by the user.

The present invention also provides an apparatus for authenticating a data received from a portable device. The apparatus comprises a controller, an I/O unit in communication with the controller, the I/O unit receiving data from the portable device, a display unit in communication with the controller, an encryption/decryption unit for decrypting the data from the portable device, and a storage unit for storing the decrypted data and a computer executable program. The computer executable program when executed by the controller enables the apparatus to receive authentication information from a user, if the authentication information is correct, decrypt the data to have destination device information, and if the destination device information matches information stored in the storage unit, enables access to a content in the data by the user.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein:

FIG. 2 is a flowchart 200 depicting a process for a content creator to upload a content;

FIG. 3 is a flowchart 300 for a user to download a content from the server;

DETAILED DESCRIPTION OF THE PREFERRED EMBODIMENTS

The technology described in this application enables provides a system and a method for remotely authenticating a holder of a software application when the network is not available. The system involves a server on the Internet, content (such as teaching material, movies, or any other protectable material) to be loaded on to the server, portable storage medium to which the content can be downloaded for transfer, and a destination device that connect to the portable storage medium and accesses the downloaded content. The system enables a content creator to upload the content onto the server and set rules and conditions for the access and retrieval. The content can be encrypted by the server. When the content is downloaded to a portable storage medium, the content will be encrypted for display at a particular destination device.

When the content is desired by a user, the user can access to the server, either directly or through a network. The server will authenticate the user and the user will then select the content that is desired and also specify the destination device. The server will check the access conditions established by the content creator against the conditions entered by the user. If the conditions entered by the user conform to the conditions established by the content creator, then the selected content will be downloaded onto the portable storage device. The content will be encrypted with the information on the destination device.

The user can transport the portable storage device with him to any remote area where the network may not be available. When the portable storage device is inserted or otherwise connected to the destination device, the software (computer executable program) on the destination device will check the destination device information on the downloaded content against the information of the destination device itself. If the destination device information matches the destination device, then the downloaded content on the portable user device will be decrypted and made available for showing. This authentication of the encrypted content and the identity of the destination device is done without the destination device being connected to any network.

The user at the remote site can send the feedback to the content creator by storing the feedback onto the portable storage medium. The feedback will be encrypted in the similar way as the original content. Once the portable storage medium connects to the server, the encrypted feedback will be uploaded and accessible by the content creator.

Figure 1:
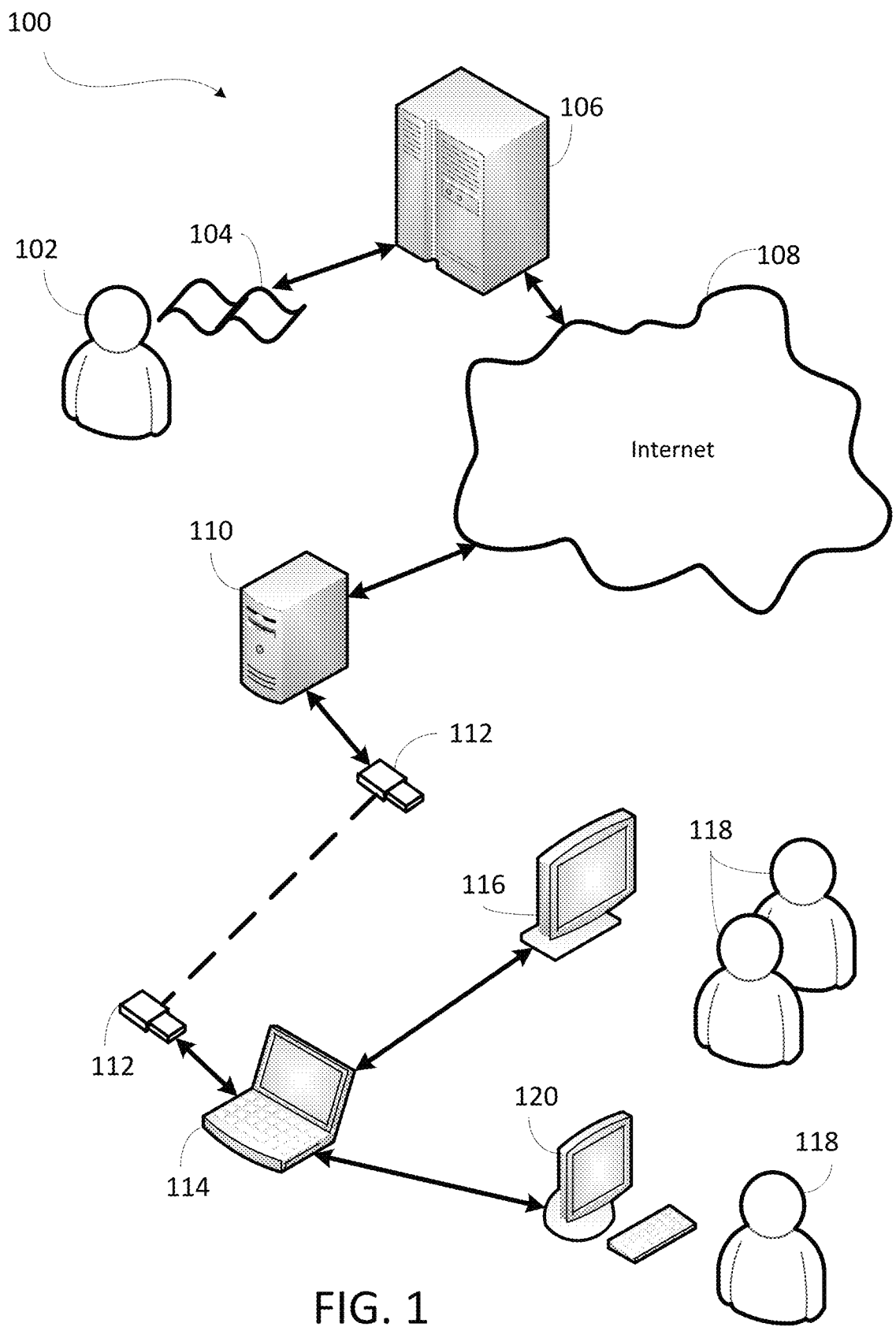
FIG. 1 is an illustration 100 of a scenario for application of the present invention.

The present invention will be easily understood by following the figures in the present application. FIG. 1 is an illustration 100 of a scenario for application of the present invention. The present invention enables a content creator 102 to create a content 104 and upload the content 104 onto a server 106. The content creator 102 can specify rules and conditions to access this content 104. The content creator 102 can restrict access to the content 104 he created to, for example, a particular geographical region or a particular level of students. The rules, the conditions, and the content 104 are encrypted and stored together in the server 106.

When an instructor wants to lecture in a remote area that may not have access to the Internet 108 (wide area network), he can download the content 104 from the server 106. The instructor can access the server 106 through the Internet 108 from his computer 110. After being authenticated by the server 106, the instructor can select the content 104 he wants to retrieve and also specify the destination device the instructor is likely to use and the qualification of students. The server 106 checks whether the instructor is allowed to access the content 104 and also whether the content 104 is approved for the destination device and the intended students. The server 106 will also check whether the instructor has the privilege to request the content 104 by checking his profile. The server 106 will also grant the permission of the access to remote users. If the instructor's request matches the conditions set up by the content creator 102, the server 106 will encrypt the requested content along with the access conditions and the permission to the remote users and download the encrypted information onto a portable device 112 specified by the instructor.

After downloading the encrypted information on the portable device 112, the instructor can take the portable device 112 to the destination device. This destination device needs not to be accessible to the server 106 or the Internet 108. After the portable device 112 is inserted on the destination device 114, the pre-loaded software on the destination device will recognize the encrypted content on the portable device 112 and start an authentication process. The authentication process will check whether the user (instructor and/or authorized student) is the correct holder of this portable device 112 and will decrypt the information on the destination device if the user is the correct holder. After decrypting the destination device information, the authentication process will verify that the content is destined for the correct destination device 114. If the portable device 112 is inserted onto an incorrect destination device, the authentication process will not decrypt the content and the encrypted content will not be available for use. Once the content 104 is loaded on the destination device 114, the content can be displayed to students 118 on a display device 116 in a class room or on a remote device 120 for a remote student 118.

The present invention will be better understood with additional figures that depict several processes during transferring contents from a server to a remote destination device. FIG. 2 is a flowchart 200 depicting a process for a content creator to upload content. The content creator 102, after creating the content, can upload the content 104 onto the server 106 by log into the server 106, step 202. The server 106 will authenticate the content creator 102. The server 106 may have a profile created for the content creator 102 and this profile may have the content creator's preferences, such as who may have access to his work and how often he would like to receive royalty payment if any. After the server 106 authenticates the content creator 102, the content creator 102 may upload the material 104 he created, step 204. The content creator 102 can specify the conditions to access this new content 104. For example, if the content is a teaching material for grade school children, he can specify to which grade the content 104 is created for and for how long the content 104 will be available for download. If the content 104 is a spy novel, he may specify the preferred age of the readers and also royalty per user that he likes to receive.

Besides the general information about the targeted readers, the content creator 102 may also specify specific destination devices. For example, the content creator may specify that the teaching material is designed in response to a special request from a school district whose server identification is XYZ. The identification of this XYZ server is available on the server 106. After the content creator 102 entered the access conditions, step 206, the server 106 will encrypt and store the content 104 and also the access conditions, step 208.

FIG. 3 is a flowchart 300 for a user to download content from the server 106. The user logs onto the server 106 and provides authentication information, step 302, and the server 106 will grant him access after properly authenticating his credentials. A menu of the available materials will be displayed to the user, step 304, and this menu is composed according to the profile of the user. For example, if the user is a second grade teacher, the only material related to the second grade will be displayed. The user can select the desired material, step 306, and the server 106 will check the selection against the user's profile, step 308. If the user does not have the privilege to access the selected material, the server 106 will decline his request and prompt him for a different selection, step 314. For example, his selection may be declined if the material is for the second grade but for a different school district. Besides selecting the material for downloading, the user may also be asked to enter the identification of students to whom the selected material is destined. If the user is authorized to access the selected material, the selected material will be encrypted along with the identification of the destination device, the access rules, and the identity of the authorized users, step 310, and downloaded onto the portable storage device 112, step 312.

Figure 4:
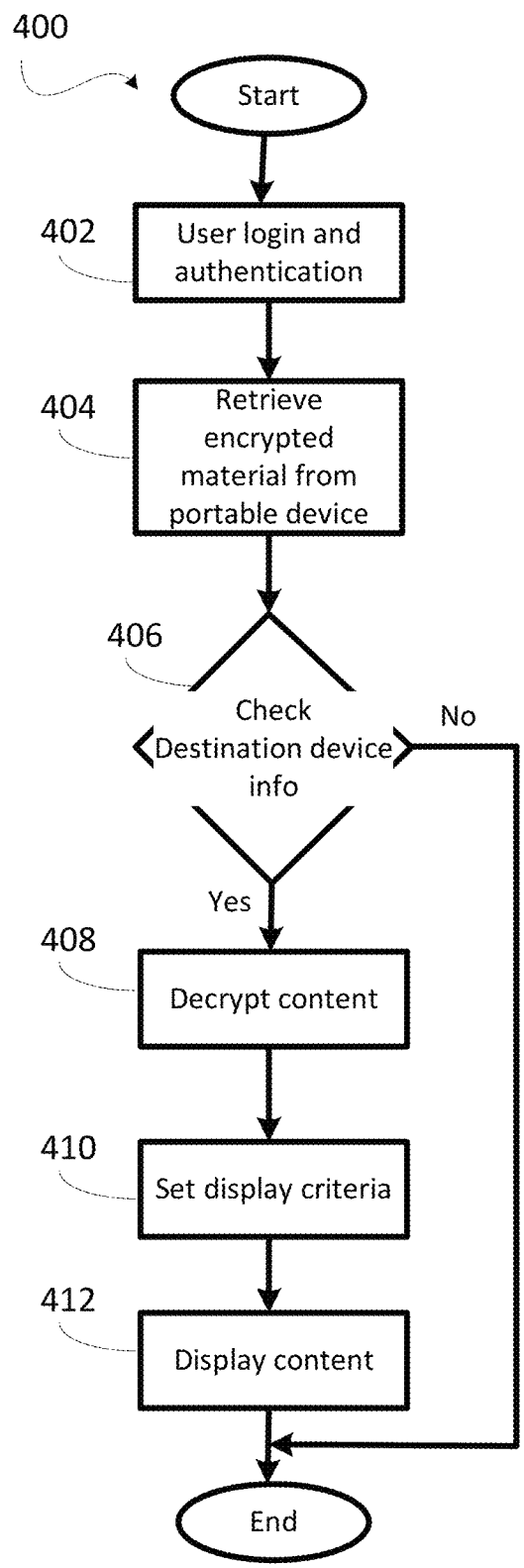
FIG. 4 is a flowchart depicting the process to install the encrypted material on the destination device 114.

FIG. 4 is a flowchart depicting the process to install the encrypted material on the destination device 114. The user logs in the destination device 114 and provides his login and authentication information, step 402, and inserts the portable storage device 112 onto the destination device 114, step 404. The destination device 114 will decrypt the information of the destination device and the authorized user information. The destination device 114 checks the information against the device information for the destination device 114, step 406. If the destination device information does not match the information stored in the destination device, i.e., the portable storage device 112 is inserted on a device that is not originally specified by the user, the destination device 114 will not decrypt the content and will not access the content. If the user at the destination device 114 does not match the authorized user information, the destination device 114 will not decrypt the content. If the server is the correct destination device, the content will be decrypted, step 408, along with the access rules. The access rules will be set for the decrypted content, step 410, and the content will be displayed according to the access rules, step 412.

Figure 5:
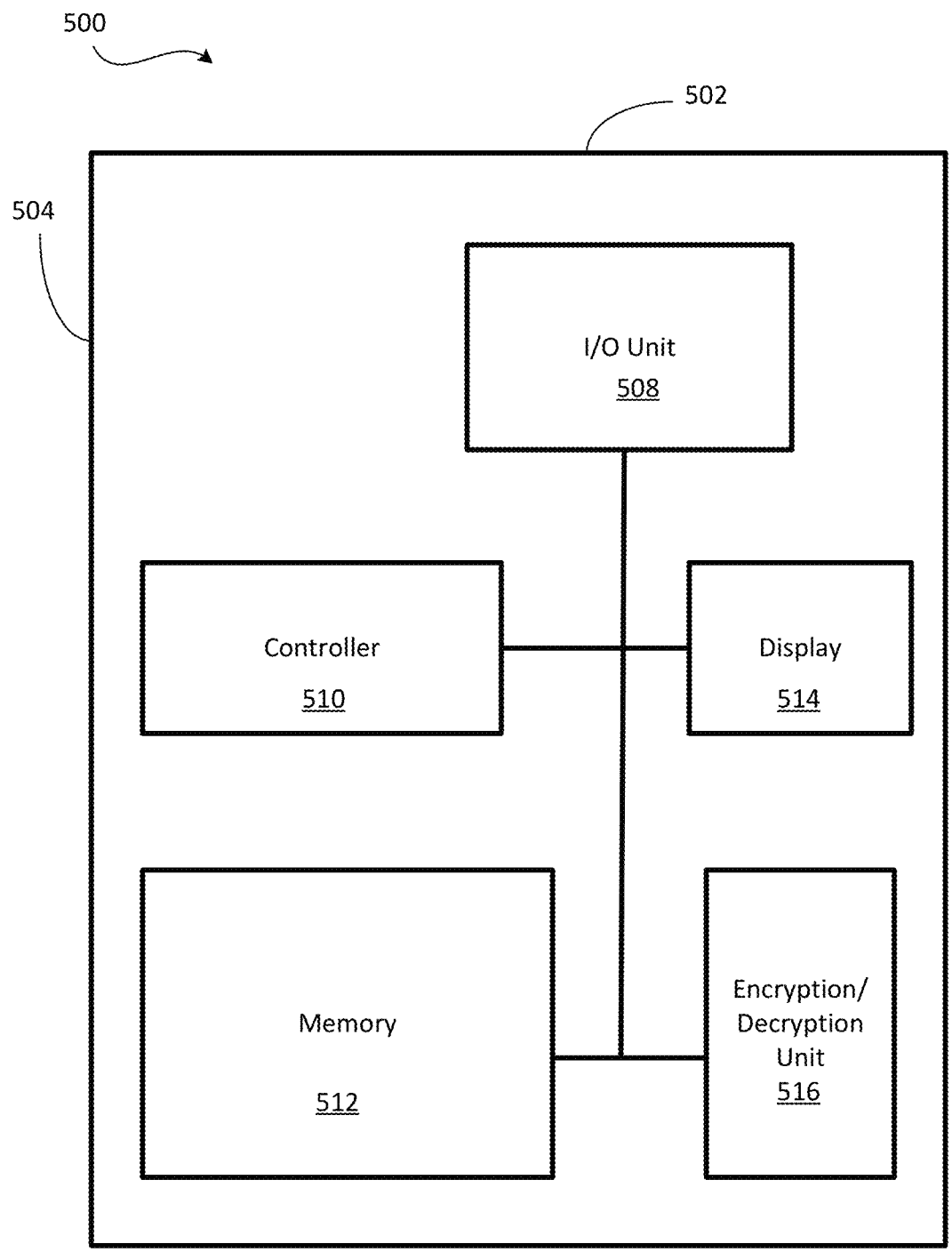
FIG. 5 is a schematic diagram 500 of a destination device.

FIG. 5 is a schematic diagram 500 of a destination device. The destination device can be a desktop computer, a laptop, a tablet device, or any computing device. The device 502 has an Input/Output (IO) unit 508, a display unit 514, an encryption/decryption unit 516, a controller 510, and a storage unit (memory) 512. The IO unit 508 controls the input/output interface, including USB connectors and network access ports. The display unit 514 enables the visual interface for the user and the encryption/decryption unit 516 is in charge of encrypting and decrypting data. The storage unit 512 stores program files executed by the controller 510 and also the teaching materials received from the user. It is also stored in the storage unit 512 the specific identification information for the device 502 and the software program.

When a portable storage device 112 is plugged on a destination device 114 (502), the controller 510 executes a program that retrieves the encrypted content in the portable storage device 112. The destination device information and the authorized user information are decrypted by the encryption/decryption unit 516 and compared with the device identification information, the user information, and the software identification information stored in the storage unit 512. If there is a match between the destination device information and the device identification information and the user is an authorized user, then the content will be loaded into the storage unit 512. The program will check the access criteria before decrypting the content. The destination device information may include information on the software, such as version number, serial number, and owner information, and information on the hardware.

The system of the present invention enables remote authentication of a content without accessing network. The content downloaded from a server will be accessed according to the rules set by the content creator and also conditions for which the content access was granted.

The authentication method described in the present application can be applied to an encrypted content transferred through a network, wired or wireless, to the destination device. The encrypted content after being sent to the destination device can be stored in the memory and before the encrypted content can be accessed by the user, the user needs to provide correct authentication information, such as password to decrypt the content, before the destination device proceeds to check the destination device information in the content against the information of the destination device. When authenticating the user and the content, there is no need to access to the network.

The system of the present invention enables an educator to download a teaching material from a server by selecting the teaching material and specifying the region and the school district that teaching material will be used. The instructor may download the teaching material onto a portable storage device, such as a USB memory stick, and take to the destination region. Alternatively, the instructor may also mail the USB memory stick to a second instructor or students at the destination region. At the targeted location, a local educator can insert the portable storage device onto a server and the software on this server will authenticate the content on the portable storage device. This authentication includes verifying that the teaching material is used in the right location or loaded on the right destination device. So, the educator can use the teaching material and conduct the class even when the network is not available.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims. It is understood that features shown in different figures and described in different embodiments can be easily combined within the scope of the invention.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure.

Although the present disclosure has been described with several embodiments, sundry changes, substitutions, variations, alterations, and modifications can be suggested to one skilled in the art, and it is intended that the disclosure encompass all such changes, substitutions, variations, alterations, and modifications falling within the spirit and scope of the appended claims.

What is claimed is:

1. A method, for authenticating a data transported from a remote server to a destination device, comprising:
   transferring the data with encrypted information of the destination device from the remote server to the destination device;
   receiving, at the destination device, authentication information from a user;
   if the authentication information is correct, decrypting when the destination device is not connected to a wide area network, at the destination device, the data to have destination device information; and
   if geographical region information in the destination device information matches geographical information stored in the destination device, enabling access, at the destination device, to a content in the data by the user.

2. The method of claim 1, wherein the destination device information includes information about school district of the destination device.

3. The method of claim 1, wherein the transferring step and the receiving step are performed when the destination device is not connected to the wide area network.

4. The method of claim 1, further comprising:
   receiving, at the remote server, material selection;
   receiving, at the remote server, the geographical location information of the destination device from the user;
   selecting, at the remote server, the content according to the material selection; and
   encrypting, at the remote server, the content with the information of the destination device into the data.

5. The method of claim 1, further comprising:
   receiving, at the remote server, a content from a content creator;
   receiving, at the remote server, access conditions from the content creator;
   encrypting, at the remote server, the content; and
   storing, at the remote server, the encrypted content.

6. The method of claim 5, further comprising:
   displaying, at the remote server, a list of materials to the user;
   receiving, at the remote server, selections from the user;
   checking, at the remote server, the selections against a profile of the user; and
   if the selections matches the profile, enabling access, at the remote server, to the content related to the selection.

7. The method of claim 6, further comprising:
   receiving, at the remote server, use information from the user;
   checking, at the remote server, the use information against the access conditions; and
   if the use information does not match the access conditions, disabling access, at the remote server, to the content related to the selection.

8. The method of claim 1, further comprising:
   decrypting, at the destination device, the data to have access conditions; and
   enabling, at the destination device, the access to the content in the data according to the access conditions.

9. An apparatus for authenticating a data received from a portable device, comprising:

a controller;

a I/O unit in communication with the controller, the I/O unit receiving data from the portable device;

a display unit in communication with the controller;

an encryption/decryption unit for decrypting the data from the portable device; and a storage unit for storing the decrypted data and a computer executable program, wherein the computer executable program when executed by the controller enables the apparatus to receive authentication information from a user when the apparatus is not connected to a wide-area network, if the authentication information is correct, decrypt the data when the apparatus is not connected to a wide area network to have destination device information, and if geographical information of the destination device information matches information stored in the storage unit, enables access to a content in the data by the user.

10. The apparatus of claim 9, wherein the destination device information includes information about school district of the apparatus.

11. The apparatus of claim 9, wherein the data includes material created by a content creator and access conditions determined by the content creator.

12. The apparatus of claim 9, wherein the computer executable program when executed by the controller further enables the apparatus to decrypt the data to have access conditions, and enable the access to the content in the data according to the access conditions.

\* \* \* \* \*